United States Patent
Hüger et al.

(10) Patent No.: US 11,662,735 B2
(45) Date of Patent: May 30, 2023

(54) METHOD AND SYSTEM FOR UPDATING A CONTROL MODEL FOR AUTOMATIC CONTROL OF AT LEAST ONE MOBILE UNIT

(71) Applicant: Volkswagen Aktiengesellschaft, Wolfsburg (DE)

(72) Inventors: Fabian Hüger, Wolfenbüttel (DE); Peter Schlicht, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 275 days.

(21) Appl. No.: 16/650,466

(22) PCT Filed: Sep. 24, 2018

(86) PCT No.: PCT/EP2018/075821
§ 371 (c)(1),
(2) Date: Mar. 25, 2020

(87) PCT Pub. No.: WO2019/063491
PCT Pub. Date: Apr. 4, 2019

(65) Prior Publication Data
US 2020/0241543 A1    Jul. 30, 2020

(30) Foreign Application Priority Data

Sep. 29, 2017 (DE) .................... 10 2017 217 444.7

(51) Int. Cl.
*G05D 1/02* (2020.01)
*G05D 1/00* (2006.01)
*G08G 1/01* (2006.01)

(52) U.S. Cl.
CPC ......... *G05D 1/0221* (2013.01); *G05D 1/0088* (2013.01); *G05D 1/0276* (2013.01); *G08G 1/0129* (2013.01); *G05D 2201/0213* (2013.01)

(58) Field of Classification Search
CPC .. G05D 1/0221; G05D 1/0088; G05D 1/0276; G05D 2201/0213; G08G 1/0129
See application file for complete search history.

(56) References Cited

U.S. PATENT DOCUMENTS

| 2010/0063626 | A1 | 3/2010 | Anderson | ..................... 700/253 |
| 2015/0244826 | A1* | 8/2015 | Stenneth | ............... H04L 67/322 709/213 |

(Continued)

FOREIGN PATENT DOCUMENTS

| CN | 103237045 A | * 8/2013 | |
| DE | 102013205392 A1 | 10/2014 | ............... G08G 1/00 |

(Continued)

OTHER PUBLICATIONS

English Translation of CN-103237045-A (Year: 2013).*

(Continued)

*Primary Examiner* — Anshul Sood
*Assistant Examiner* — Matthew Ho
(74) *Attorney, Agent, or Firm* — Slayden Grubert Beard PLLC (57) ABSTRACT

The invention relates to a method for updating a control model for automatic control of at least one mobile unit. A central control unit generates a detection task and transmits same to the mobile unit. The mobile unit comprises sensors, and the detection task comprises conditions for detecting sensor data sets by means of the sensors. The mobile unit detects the sensor data sets by means of the sensors using the detection task, generates transmission data using the detected sensor data sets, and transmits the transmission data (Continued)

to the central control unit. The central control unit receives the transmission data and generates an updated control model using the received transmission data. The system according to the invention for updating a control model for automatic control of at least one mobile unit comprises a central control unit by means of which a detection task may be generated and transmitted to the mobile unit. The mobile unit comprises sensors, and the detection task comprises conditions for detecting sensor data sets by means of the sensors. The sensor data sets may be detected by means of the sensors of the mobile unit using the detection task, transmission data may be generated using the detected sensor data sets, and the transmission data may be transmitted to the central control unit. In doing so, the central control unit may receive the transmission data, and an updated control model may be generated using the received transmission data.

19 Claims, 2 Drawing Sheets

(56) References Cited

U.S. PATENT DOCUMENTS

| | | | |
|---|---|---|---|
| 2016/0001775 A1 | 1/2016 | Wilhelm et al. | 701/25 |
| 2017/0011561 A1 | 1/2017 | Makke et al. | 701/2 |
| 2017/0135621 A1 | 5/2017 | Lee et al. | 701/27 |
| 2017/0174221 A1 | 6/2017 | Vaughn et al. | 701/23 |
| 2017/0192423 A1* | 7/2017 | Rust | G05D 1/0238 |
| 2017/0270361 A1* | 9/2017 | Puttagunta | G06V 20/56 |
| 2017/0301236 A1 | 10/2017 | Zydek et al. | |
| 2017/0356748 A1* | 12/2017 | Iagnemma | G01C 21/34 |

FOREIGN PATENT DOCUMENTS

| | | | |
|---|---|---|---|
| DE | 102014212898 A1 | 1/2016 | B60W 30/08 |
| DE | 102015214689 A1 | 2/2016 | B60W 30/08 |
| DE | 102015219470 A1 | 4/2016 | G08G 1/00 |
| DE | 102015213594 A1 | 1/2017 | G08G 1/09 |
| DE | 102016007568 A1 | 2/2017 | G08G 1/01 |
| DE | 102017217444 A1 | 4/2019 | B60W 50/00 |
| EP | 0813479 B1 | 8/2006 | B60K 31/00 |
| EP | 2164059 A1 | 3/2010 | G08G 1/16 |
| EP | 3151213 A1 | 4/2017 | B60R 1/00 |
| EP | 3219564 A1 | 9/2017 | B60W 10/04 |
| WO | 2015/020290 A1 | 2/2015 | H04B 7/04 |
| WO | 2019/063491 A1 | 4/2019 | G05D 1/02 |

OTHER PUBLICATIONS

German Office Action, Application No. 102017217444.7, 7 pages, dated May 9, 2018.

International Search Report and Written Opinion, Application No. PCT/EP2018/075821, 24 pages, dated Dec. 10, 2018.

* cited by examiner

METHOD AND SYSTEM FOR UPDATING A CONTROL MODEL FOR AUTOMATIC CONTROL OF AT LEAST ONE MOBILE UNIT

CROSS-REFERENCE TO RELATED APPLICATIONS

This application claims priority to German Patent Application No. DE 10 2017 217 444.7, filed on Sep. 29, 2017 with the German Patent and Trademark Office. The contents of the aforesaid Patent Application are incorporated herein for all purposes.

TECHNICAL FIELD

The present invention relates to a method for updating a control model for automatic control of at least one mobile unit. Furthermore, the invention relates to a system for updating a control model for automatic control of at least one mobile unit.

BACKGROUND

Given the variety and complexity of the driving situations and environments arising while operating an automatically controlled vehicle, it is not always possible for the automatic system to manage the task of driving with the same quality. Depending on the situation, restrictions in comfort to the passengers of a vehicle may for example occur, or a route may not be traveled within the optimum time.

A method for the automated driving of an ego vehicle is proposed in DE 10 2014 212 898 A1 in which an emergency trajectory is generated to prevent a collision, inter alia using such data that are detected through Car2Car communication.

EP 2 164 059 A1 describes a method for monitoring a traffic situation in which sensor data are exchanged between several vehicles participating in the traffic situation. The trajectories of the vehicles are then regulated using this data.

Furthermore, methods are known in which test drivers with specially equipped vehicles intentionally perform drives in problematic situations. The data detected in this context are used to improve the systems for automatic driving. This is however associated with high costs and a major time outlay if a very large number of individual situations are to be detected.

SUMMARY

An object of the present invention is to provide a method and a system of the aforementioned type in which automatic driving of a mobile unit may be optimized very efficiently and comprehensively.

This object is solved by a method and a system according to the independent claims. Embodiments of the invention are the discussed in the dependent claims and the following description.

DETAILED DESCRIPTION

In the method according to a first exemplary aspect , a central control unit generates a detection task and transmits it to the mobile unit. In this context, the mobile unit comprises sensors, and the detection task comprises conditions for detecting sensor data sets by the sensors. The mobile unit detects the sensor data sets by means of the sensor data based on the detection task, generates transmission data using the detected sensor data sets, and transmits the transmission data to the central control unit. The central control unit receives the transmission data and generates an updated control model using the received transmission data.

This allows a particularly targeted collection of data, and optimization of the control model may be performed faster and more efficiently than with the known methods.

The method is, e.g., executed in different phases. Accordingly, a need for optimization may be identified in a first phase. In another phase, a cooperative detection and learning task may be ascertained and transmitted to participating mobile units. In another phase, cooperative exploring, measuring and learning is carried out by the mobile units, or respectively by using data that were detected by these units. In another phase, the results may be transmitted to the mobile units, and an optimized functionality may be activated.

A control model within the meaning of the present discussion denotes a unit of a control system that is used to automatically control a mobile unit. The control model serves in this context to evaluate information on the current driving situation of the mobile unit, wherein sensor data, e.g., are evaluated, and to make a decision about a reaction by the mobile unit, or respectively to determine parameters for an automatic driving function. For instance, it is provided that automatic controlling is carried out by means of modules that actuate specific devices of the mobile unit, wherein the modules are each assigned a control module. For example, a control module may be provided to be used with a neural network or a machine learning method.

The mobile unit is, e.g., a motor vehicle. In the method, a plurality of mobile units, e.g., motor vehicles, may be provided that for example may be organized as a coherent fleet of vehicles.

For example, the central control unit is comprised by an external server. The central control unit may furthermore be another vehicle-external apparatus and may for example be comprised by a distributed computer system. The central control unit may have an interface by means of which data may be transmitted by the mobile unit, or respectively the plurality of mobile units.

The transmission of data between the mobile unit and the central control unit may occur in a manner known per se by means of a data link between the mobile unit and the central control unit, e.g., wirelessly. For example, the link may be established by a local network or a larger network such as the Internet. Furthermore, the link may be established by a telecommunications network such as a mobile network, or a wireless local network (such as WLAN). Furthermore, the data link may occur by connecting a data cable. The link may also be established by another unit that itself may establish a link to the central control unit. For example, a data link may exist between the mobile unit and a cell phone connected to the Internet, for example by a data cable or a radio connection such as by Bluetooth. For example, the link may be established over the Internet.

In the method, a detection task is transmitted by the central control unit to the mobile unit. This comprises conditions for detecting data using sensors of the mobile unit. These conditions define for example which types of sensor data are to be recorded in which driving situations. That is, the recorded sensor data sets may be formed using the conditions of the detection task. This does not necessarily mean that the sensors of the mobile unit only detect sensor data when the conditions of the detection task have been met. Instead, ongoing detection may also be provided, wherein the data to be detected are selected using the detection task, e.g., using the conditions comprised by the detection task. For example, the detected sensor data may be stored in a ring memory that then may be analyzed using the detection task with the conditions in order to generate the relevant sensor data sets.

The transmission data generated using the sensor data sets may be formed in various ways, and may for example comprise the data of the sensor data sets. The sensor data sets may furthermore be processed, for example to anonymize personal data, or to execute a method step to already generate a temporarily updated control model at this point, for example to relieve the central control unit, or to allow it to further process the transmission data provided by the mobile unit.

The transmission data may be transmitted to the central control unit in a manner known per se. For instance, it may be provided that a data link is established between the mobile unit and the central control unit at certain times, for example after concluding a trip, e.g., to perform a transmission of transmission data and/or a detection task. Furthermore, a data link that is established at periodic intervals or a continuous data link may be provided.

The updated control model is also generated in a manner known per se using the transmission data, e.g., by means of a machine learning method. For instance, it is based on an earlier version of the control model, for example the control model used by a module of the mobile unit, or another control model. Furthermore, the updated control model may be based on other models, or may be created completely new using the transmission data.

The method according to the present aspect may be implemented to enable cooperative learning in order to recognize problematic situations in the automatic drive, and e.g., to cooperatively generate strategies and data with other vehicles in order to optimize their driving functions based on this knowledge. By using a central control unit, many vehicles of a vehicle fleet may be used to detect data. The potentially very large amounts of data that accrue in the process may be detected more efficiently by intentionally requesting specific sensor data in specific situations, and the overall volume may be reduced.

The conditions that differ slightly in each drive of a vehicle of a fleet, for example depending on the current weather, time of day and the exact position of a vehicle, allow comprehensive detection of data under different conditions. Data-driven autonomous driving functions may be very comprehensively optimized in this manner.

In one embodiment, a requirement message is received by the central control unit, and the detection task is generated using the requirement message. This allows a reaction to recognized weaknesses in the existing system to generate the updated control model.

In the present context, the requirement message may for example comprise information on a functioning of the control model, e.g., an evaluation of the function of an automatic driving function that for example is controlled by a module for automatic controlling by means of a control model. It may therefore be recognized if the automatic control is not functioning optimally. The requirement message furthermore comprises information on a context in which the non-optimum functioning occurs. For instance, the situations and/or the locations in which a weakness occurs is ascertained. An identified weakness may for example refer to a location, a class of locations, a situation or a class of situations. The method makes it possible to deal with the weaknesses ascertained in this manner and to use the available resources as efficiently as possible.

Non-optimum functioning may arise from various factors, wherein, e.g., an analytical step may be provided in which it is determined which control model is responsible for controlling the relevant automatic driving function for non-optimum functioning.

The information comprised by the requirement message on the context in which the non-optimum driving occurred may for example relate to a position, a traffic situation or a state of the mobile unit. Accordingly, for example, information may be comprised on the driven traffic infrastructure such as the type of a road, courses of roads, intersections, junctions or traffic lights and rights of way, on an executed driving maneuver such as a passing procedure or turning, on an operating state of the mobile unit, such as an operating temperature, a speed or acceleration, or on climate conditions such as rain, fog, night, twilight or strong sunlight.

A weakness, or respectively a non-optimum functioning of an automatic driving function may for example be identified using one of the following factors: Occurrence of a critical, or respectively unsafe system state, hazardous or excessively dynamic maneuvers, interventions by a safety function in automatic controlling, uncomfortable driving behavior, unsafe (virtual) sensors, or an identified misperception. Furthermore, a non-optimum coordination of individual components along the processing chain of automatic driving may be identified, e.g., in one of the elements of sensors, perception, recognition, situation detecting, production, planning and actuators. Moreover, a weakness may be identified when an intervention by the vehicle driver was detected.

The requirement message is generated, e.g., by means of sensor data that are detected during automatic driving of the mobile unit. These sensor data may for example be detected by sensors of the mobile unit itself, or by vehicle-external sensors. This sensor data may also be evaluated and the requirement message may also be generated by different units.

For example, in order to identify a weakness of the automatic driving functions, a parameter measured by means of sensors is compared with a threshold value and, when the threshold value is exceeded or respectively undershot, this may be interpreted as an indication of the presence of a weakness. For example, the parameter may be acceleration in the longitudinal and/or transverse direction relative to the vehicle axis, wherein in this case, the identification of non-optimum functioning may be carried out with reference to the occurrence of a sudden acceleration or deceleration. In another example, the parameter may be a speed of the mobile unit that is compared with speeds of other mobile units on the same route. If for example it is found that the automatically controlled mobile unit is traveling the same route much slower than other mobile units, non-optimum functioning may be inferred from this.

The identified weaknesses of the automatic driving functions may, e.g., comprise so-called "corner cases" that may occur in extreme cases, e.g., when specific parameters simultaneously assume extreme values. Furthermore, the weaknesses may represent situations in which an improvement of the control model is needed for automatic controlling.

In another design, the requirement message is generated by the mobile unit, wherein driving data detected, e.g., by means of sensors of the mobile unit are used. The central control unit thereby obtains information about an update requirement for the control model directly from the mobile unit.

In one embodiment, the requirement message is generated by a traffic monitoring apparatus. For instance, generation occurs automatically. Additional vehicle-external apparatuses may may therefore be used in order to identify a weakness in automatic controlling.

The traffic monitoring apparatus in this case is for instance a vehicle-external apparatus permanently installed relative to the traveled road for detecting data on the traffic within a specific spatial region. In this case, communication may also be provided between the mobile unit and the traffic monitoring apparatus (for example by means of "Car2X"), wherein for example an automatically controlled vehicle may be identified. Traffic monitoring apparatuses may for example be provided at intersections, construction sites in the area of schools and public facilities, at toll stations, or along public traffic routes. For example, the movement of the mobile unit may be detected by such an apparatus, e.g., in conjunction with other mobile units, and an evaluation may be carried out. For example, it may be detected whether an optimum trajectory is being traveled by the mobile unit in order to travel a section as safely and quickly as possible. For example, a traffic monitoring apparatus may register that an automatically controlled vehicle tends to weave in certain situations.

In other examples, a weakness may be identified by another unit, for example by a subunit of the central control unit, or an external server. In doing so, data detected by the mobile unit and/or traffic monitoring apparatuses may be evaluated in order to ascertain the occurrence of a weakness and information on a context in which this weakness is occurring. The requirement message may in this case be generated by the other unit and transmitted to the central control unit.

An optimization requirement for an automatic function, or respectively a control model, may be identified in different ways. Initially, the occurrence of the weakness itself may be recognized using the above-described factors, for example with reference to sudden changes in speed, or automatic interventions by a safety function. Furthermore, "data mining" methods may be used in order to determine the situations in which the weaknesses occur. In doing so, driving data may be investigated in order to discover correlations between system weaknesses and environmental parameters such as geographic parameters, climate conditions, traffic, the road type, speed, time of day and year, etc. Furthermore, an observation of the traffic may be used in order to recognize anomalies such as a traffic jam or dense traffic. Moreover, an evaluation of the reliability of decisions on the runtime of individual modules may be carried out along the processing chain. Plausibilisation methods for individual components or the overall system may be applied. Furthermore, a frequency at which switching occurs between redundant system components may be determined. Moreover, physical measured quantities may be evaluated such as longitudinal and transverse accelerations, e.g., relative to surrounding traffic or the course of the road. A response by passengers may be measured, for example by a driver observation, a detection of manual interventions, and/or explicit feedback. Furthermore a parameter may be measured and compared with a prediction for the same parameter from a preceding time step in order to evaluate the reliability of the prediction.

In one embodiment, the central control unit receives a plurality of requirement messages. A weighting of the requirement message is performed, and the detection task is generated using the weighted requirement message. Consequently, a plurality of requirement messages may be managed, and the generation of the detection task may be coordinated.

For this purpose, communicated weaknesses, e.g., using requirement messages, are collected and evaluated by the central control unit. Aspects of a control model that must be urgently optimized may be identified, for example using the frequency with which a functional weakness occurs, using a strong correlation between a functional weakness and specific environmental parameters, or using the severity of identified weaknesses. To accomplish this, the severity of a weakness may be evaluated using an established scale, and more serious weaknesses may be urgently dealt with. The weighting of the requirement messages may therefore be performed using different evaluation criteria, wherein combinations of the criteria may also be provided.

This procedure of collecting and evaluating is performed, e.g., fully automatically, continuously, and parameterized by the central control unit. For instance, methods from the field of "big data" are used in this case, wherein large amounts of data of different types are processed at a high speed.

After identifying a functionality to be optimized, or respectively a control model to be updated, the central control unit generates a detection task and transmits it to the mobile unit. The detection task is, e.g., an explicit learning task that for example is transmitted to the vehicles of a vehicle fleet. The conditions comprised by the detection task for detecting sensor data sets are specifically configured for the particular application.

The detection task may refer to a module level, wherein the module within the automatic control of the mobile unit serves to control a specific automatic driving function. In doing so, the control model is used by the module in order to determine target values of the automatic control, and/or to make decisions for the automatic control. In one module, different non-optimum functionings may occur such as a great uncertainty, misclassifications, or wrong predictions. For optimization, specific data may be collected for the situation in which the weakness of the control model occurs. This data may for example comprise image data, map data and/or different sensor data. A local update of the control model may occur, wherein in this case, the transmission data comprise data from this local update, and the central control unit may perform a consolidation in which the locally performed updates (for example in several different mobile units) are combined to generate an updated control model.

Alternatively or in addition, the detection task may refer to a planning level of the automatic control. In this case, the weakness relates to a control model that controls an automatic driving function using the output of a plurality of modules. A control model on the planning level is therefore, e.g., located on a stage higher than the module level.

A function for automatically planning driving may provide that a selection will be made from a series of different candidates for trajectories and/or decisions on automatic control in relevant situations. In doing so, the best candidate is to be selected. To optimize such a function, an exploration phase may be provided during which the option that is recognized as the "best candidate" is not selected; instead, another trajectory that is safely travelable but is designated as not ideal is selected. That is, different candidates than the actually desired option are tried and may be reevaluated using the data detected during execution. The new evaluation results generated in this manner may be transmitted to the central control unit, and the control model may be optimized using the newly generated knowledge on the level of automatic driving planning.

Furthermore, optimization may occur on a system and redundancy level, wherein by systematically collecting decision parameters during the internal evaluation of the individual module results along the processing chain and on the redundancy level, various system settings may be exploratively optimized with respect to a specific given situative weakness. In such an explorative optimization, decisions may be made during automatic controlling for undesired options, similar to the manner described above, as long as they are found to be sufficiently safe.

It may be provided that the detection task is transmitted to all the vehicles of a vehicle fleet. This may be done, e.g., to collect data and to train and optimize a control model in a "shadow mode" in which the control model or a partial functionality thereof does not actively intervene in the driving system or change the current configuration of the automatic driving function. In this manner, it is ensured that there are no uncontrolled changes of the automatic control.

Furthermore, the detection task may relate to part of a vehicle fleet, e.g., vehicles that are technically equipped in a special way, or whose drivers have approved of a safe explorative data collection. In this case, e.g., data on a behavior of automatic control may be detected and changed in the sense of producing data and knowledge, and in the area of safe driving behavior. For instance, such a part of the vehicle fleet may comprise special research and development vehicles that are driven by test drivers and are equipped with special development hardware and/or special sensors.

During the subsequent progression of the method, cooperative exploration and measurement is performed by the participating mobile units; furthermore, cooperative learning by the mobile units may occur. This is coordinated by the central control unit.

The detection task transmitted to the mobile units is executed. According to the method, sensor data sets are detected and transmission data are generated which are then transmitted to the central control unit. In doing so, e.g., the conditions comprised by the detection task are taken into account when detecting sensor data sets. For instance, the participating mobile units may be notified by the central control unit, wherein, e.g., a data link is created and the detection task is transmitted.

In another design, the conditions of the detection task for detecting sensor data sets comprise data on traffic situations. The sensor data sets may therefore be detected very specifically for certain situations in which a weakness of the existing system was found. The data on traffic situations relate for example to features of a traffic infrastructure such as intersections, the course of the road or road types. They may furthermore relate to specific driving maneuvers as well as a state of the mobile unit, for example using vehicle data. They may furthermore relate to other mobile units that are, e.g., located in the surroundings of the mobile unit.

Alternatively or in addition, the detection task may comprise other conditions such as information on relevant functionalities, parameters to define the situations for which sensor data sets are to be detected (such as triggering events, definitive boundary conditions for the learning process to be performed), system parameters to be optimized, triggering conditions and the type and quality of the data to be detected. Furthermore, the detection task may comprise information on a specific type of detection of sensor data sets and their processing to generate transmission data such as a specific algorithm, definitive parameters or learning rates for a specific training method. Furthermore, an update frequency may be defined that defines the transmission of the transmission data to the central control unit. Moreover, conclusion conditions may be defined ("definition of done"), wherein a conclusion configuration is defined which defines a final transmission of the transmission data to the central control unit. During the detection of the sensor data sets and the generation of the transmission data, meta information may also be collected, the type of which is established by the conditions of the detection task.

The information detected and/or generated by the mobile unit may be structured by means of an evaluation matrix for functional variants in order to provide the data in a systematic and easy to process manner.

During the automatic control of the mobile unit, sensor data are detected by their respective sensors, and situations or situation classes are recognized for which the detection task provides the detection and/or transmission of data, or respectively an initiation of a learning process.

For example, it is provided that the data detected by the sensors of the mobile unit are stored in a ring memory that for example offers the data of the last 10 minutes at any point in time. The offered data may for example include sensor data, map data and/or data available through a CAN bus. If a relevant situation or situation class is detected, data from the recent past may also be retrieved from the ring memory.

Furthermore, synchronization of the detected data may be provided when there are several participating mobile units.

The detection task defines, e.g., conditions for a conclusion of the learning phase by the mobile unit, wherein in this case, e.g., the detection of sensor data sets is ended, and/or the transmission data are transmitted. This may for example be done at a specific, previously established point in time. Furthermore, a termination condition may be provided, or a signal may be transmitted by the central control unit to the mobile unit in order to trigger the conclusion of the learning phase.

Upon reaching the conclusion criterion for a detection task, the phase of detecting sensor data sets and generating transmission data is terminated for all participating mobile units. The obtained information that was, e.g., transmitted by means of the transmission data to the central control unit are aggregated and processed by the central control unit. The updated control model is generated, wherein, e.g., the new information is integrated in the respective function in order to configure and/or optimize the respective function more robustly. In doing so, a compression of the updated control model may also be performed. Newly obtained knowledge may be identified and saved. Already existing older data may be used in addition to the data obtained from the detection task to generate the updated control model.

In one embodiment, the central control unit performs training for a previous control model to generate the updated control model using the transmission data. In doing so, a machine learning process is used in an example. This may yield targeted optimization of the control model.

In one embodiment, training of an integrated control model is performed to generate the transmission data by the mobile unit. For example, the transmission data comprise data of the integrated control model trained in this manner. In this case as well, a machine learning method, e.g., is also used. The transmission data may therefore be preprocessed so that for example anonymous forwarding of the data may be ensured. Furthermore, a cooperative learning method may be designed very efficiently in this manner. For example, the transmission data in this case comprise data of a control model that was already trained by a training method so that a temporarily trained control model is provided.

That is, the training process may be performed by the mobile unit itself, and/or by the central control unit. This permits a particularly flexible embodiment of the system in that different steps of the training are performed by the most suitable unit in each case.

A consolidation is performed by the central control unit using the transmission data, wherein transmitted data from training processes in the mobile unit may also be used. For example, the results of training in a plurality of mobile units may be consolidated, for example by averaging specific parameters, or by other methods of distributed learning that are known per se.

Additional steps may be performed that are required for using the updated control model for the mobile unit. For example, an evaluation may be carried out with respect to safety aspects; the updated control model may be optimized for a specific target hardware for example by performing a reduction or deleting unused subfunctionalities. Furthermore, structural optimization may be carried out in order to achieve optimum hardware exploitation.

In another embodiment, the updated control model is transmitted to the mobile unit, and automatic control of the mobile unit is performed using the updated control model. The mobile unit thereby profits from the control model optimized using the sensor data sets since improved control is enabled.

In this case, first the updated control model may be transmitted to a release process which ensures that only approved updates or changes to the control model of the mobile unit are performed. There may then be a "rollout" in which the updated control model is transmitted to the mobile unit and then may be used for automatic controlling.

In other embodiments, apparatuses of a vehicle-external infrastructure may be employed alternatively or in addition to using mobile units to detect sensor data sets and generate transmission data. As described above, a requirement message may be generated by a traffic monitoring apparatus. In addition however, other data may be detected, for example by an apparatus for observing traffic along a certain route. In this manner, cooperative learning may be realized based on as many information sources as possible.

For example, driving functions may be used by apparatuses of an infrastructure for monitoring traffic, such as cameras and/or communication apparatuses on a road or at an intersection in order to detect sensor data sets for the method according to the present aspect and provide suitable transmission data. For this purpose, these apparatuses may be optimized in order for example to perform specific method steps of preprocessing using the detected data.

Apparatuses of such an infrastructure may for example identify an optimization need as well as generate a corresponding requirement message and transmit it to the central control unit. Subsequently, a detection task may be generated for similar situations and transmitted to mobile units, wherein in doing so, conditions may be generated so that, in addition to the concrete situation monitored by the infrastructure apparatus such as a specific intersection, sensor data sets may also be detected for comparable situations, for example at similar intersections not monitored by a fixed infrastructure.

Furthermore, an optimization requirement may be identified in a situation without infrastructure monitoring, and a detection task may be created for a situation monitored by means of an infrastructure apparatus. The obtained knowledge may then be transferred to semantically similar situations such as comparable intersections. The updated control model may be designed so that optimization by means of data from monitored situations also occurs for non-monitored situations.

A system is provided in another aspect for updating a control model for automatic control of at least one mobile unit, which system comprises a central control unit by means of which a detection task may be generated and transmitted to the mobile unit. The mobile unit comprises sensors, and the detection task comprises conditions for detecting sensor data sets by the sensors. In doing so, the sensor data sets are detectable by the sensors of the mobile unit based on the detection task, transmission data may be generated by the detected sensor data sets, and the transmission data may be transmitted to the central control unit. In doing so, the central control unit may receive the transmission data, and an updated control model may be generated using the received transmission data.

The system of this aspect is designed, e.g., to implement the method according to the first aspect described above. The system thus has the same benefits as the method.

For example, the system comprises a plurality of mobile units, e.g., a plurality of motor vehicles.

The invention will now be explained in further detail based on exemplary embodiments with reference to the drawings.

Figure 1A:
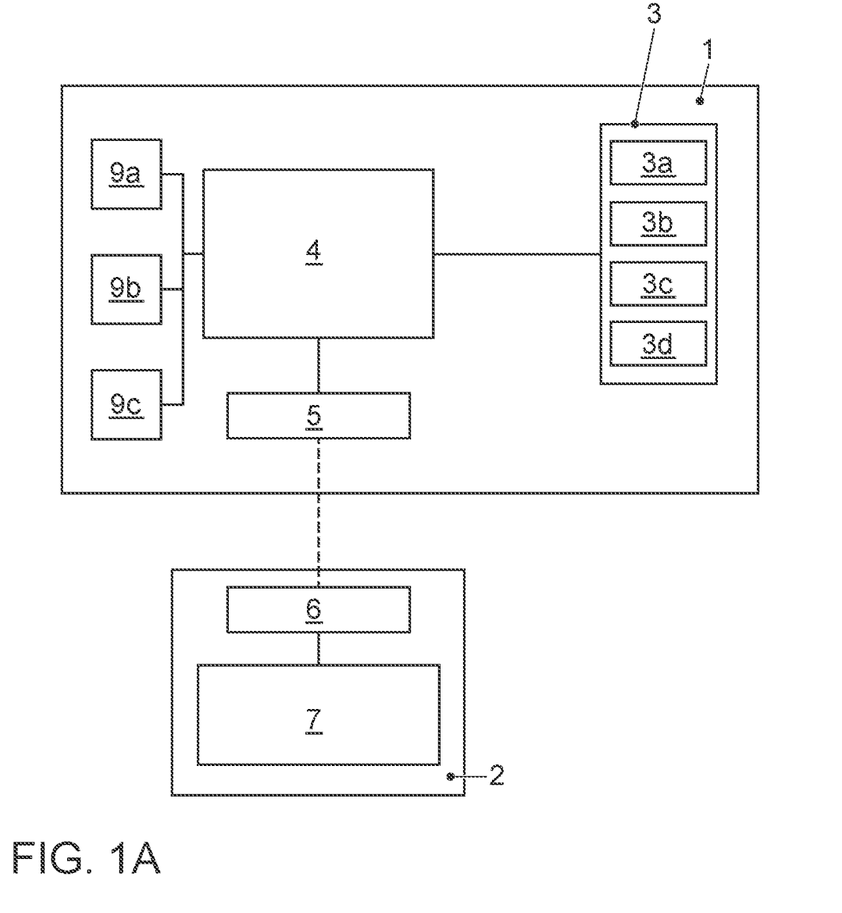
FIGS. 1A and 1B show exemplary embodiments of the system.
Figure 1B:
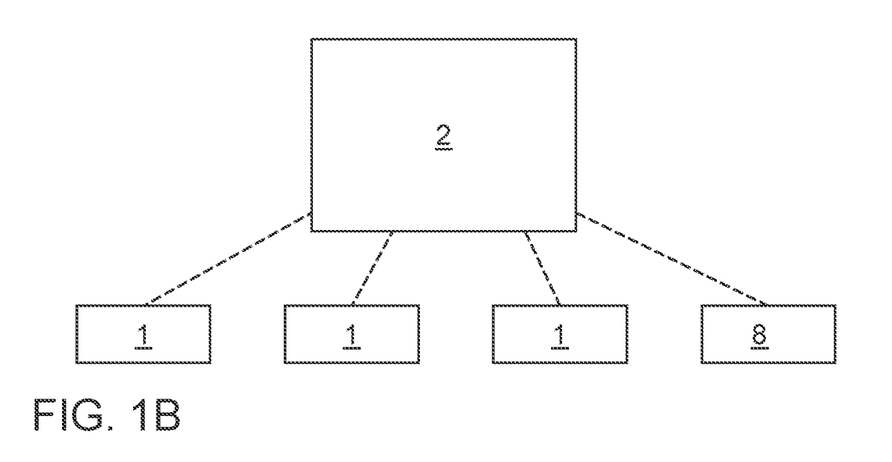

With reference to FIGS. 1A and 1B, exemplary embodiments of a system according to an embodiment will be explained.

A mobile unit 1, in the present case a vehicle 1, comprises a computing unit 4 that is coupled to a detection unit 3, actuators 9a, 9b, 9c and a vehicle interface 5. The detection unit 3 comprises sensors 3a, 3b, 3c, 3d. The actuators 9a, 9b, 9c in the example comprise apparatuses for engine control, steering and braking the vehicle 1. The sensors 3a, 3b, 3c, 3d are designed in a manner known per se and comprise for example a camera, a laser scanner, ultrasonic distance sensors as well as an apparatus for detecting user input.

By means of the vehicle interface 5, a data link (indicated by a dashed line) to a server interface 6 of a central control unit 2, in the present case a vehicle-external server 2, may be established at least temporarily. The server 2 comprises an updating unit 7 coupled to the server interface 6.

In other exemplary embodiments, the vehicle 1 and the server 2 may be configured differently. For example, the equipping of the vehicle 1 with sensors 3a, 3b, 3c, 3d and actuators 9a, 9b, 9c may be configured differently.

As shown in FIG. 1B, the system may comprise a plurality of mobile units 1 that may at least temporarily establish a data link with the central control unit 2. In this exemplary embodiment, a traffic monitoring apparatus 8 is furthermore provided for which a data link may also be established with the central control unit. The traffic monitoring apparatus 8 in this case is not shown in detail; however analogous to the mobile units 1, it comprises a detection unit with sensors 3a, 3b, 3c, 3d as well as a computing unit 4 and an interface to establish the data link. The number of mobile units 1 and traffic monitoring apparatuses 8 may of course be different depending on the concrete embodiment.

Other exemplary embodiments may provide that data links of the mobile units 1 to each other and/or to the traffic monitoring apparatuses 8 may be established for example in a manner known per se by means of a Car2Car or respectively Car2X method.

The data links may be permanent or may be established at specific points in time, such as periodically or upon request. They are established in a manner known per se, e.g., by a wireless link, for example via a mobile network, local computer network (such as WLAN), or by means of another apparatus through which the data link may be established such as a cell phone. For example, the link is established by a computer network such as the Internet.

Furthermore it is provided, e.g., that the establishment of the data link is associated with a method for authentication. In doing so, a protected link is established between the server 2 and the vehicle 1, or respectively the traffic monitoring apparatus 8. This is accomplished for example by means of a login method.

Figure 2:
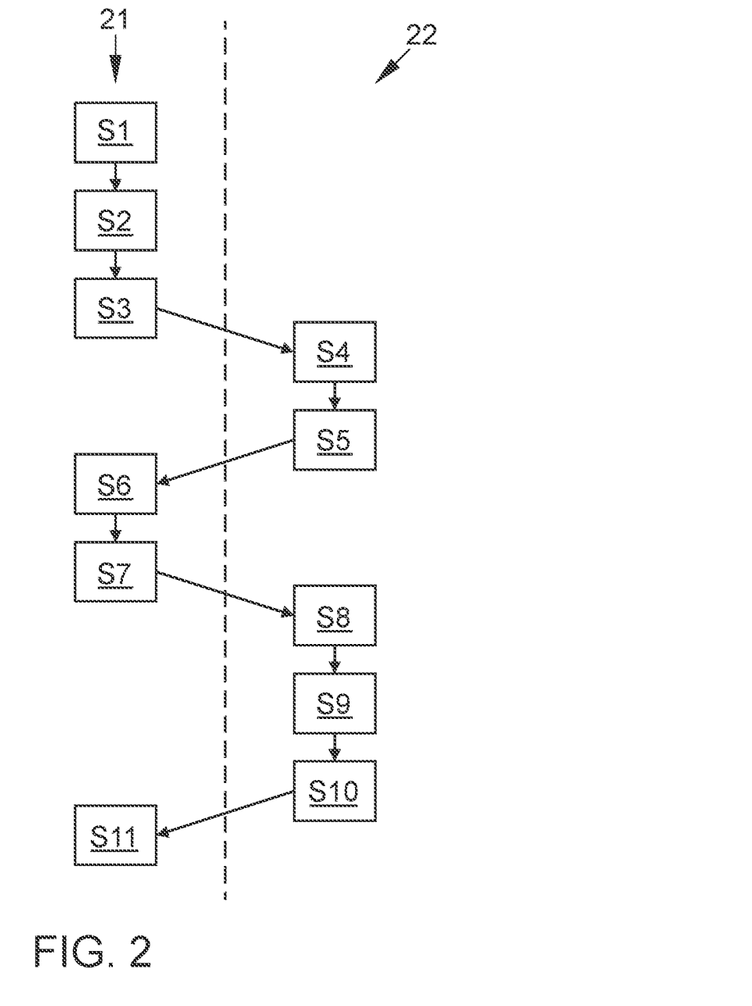
FIG. 2 shows an exemplary embodiment of the method.

An exemplary embodiment of a method will be explained with reference to FIG. 2. In this case, a dashed line indicates the separation between method steps that are carried out in the vehicle (reference sign 21), or respectively that are performed in the server 2 (reference sign 22).

In a first step S1, automatic driving is performed with the vehicle 1. In doing so, different automatic driving functions are controlled by modules which make driving decisions by means of control modules and/or determine parameters for controlling the driving. In the exemplary embodiment of the system as shown in FIG. 1A, the computing unit 4 comprises the modules with the control models, and control signals are generated and transmitted to the actuators 9a, 9b, 9c through which the actual controlling of the vehicle is then carried out, e.g., its movement.

In another step S2, a weakness is detected, i.e., an instance of non-optimum functioning of the automatic control. This detection occurs in the example by means of sensor data of the vehicle 1 through which inter alia accelerations in the longitudinal and transverse direction are detected relative to the longitudinal axis of the vehicle. The acceleration is compared with a threshold value, and if it is exceeded (that is, for example, in the event of abrupt braking or a sudden deviation from the driving direction), this is interpreted as the occurrence of a weakness. Alternatively or in addition, other methods for recognizing a weakness may be used in this case, for example a comparison with other sensor data through which for example a more precise recognition of the traffic situation may be achieved. In other exemplary embodiments, other methods may be provided in order to recognize weaknesses in automatic driving.

The detected weakness is assigned to a module for automatic controlling, e.g., the assignment is to a specific control model of the module. For example, a weakness may be detected for a specific module with a control model for planning cornering, a passing maneuver, maintaining a specific distance to other road users, or for a lane assist. Additional examples comprise a module to control following another vehicle driving ahead, a module for performing a turning process, a module for driving through a building site, and/or a module for performing a parking procedure. Subsequently, the relevant control model will be trained to optimize it.

For this, a requirement message is generated in a step S3 and transmitted to the server 2. The requirement message comprises information on the detected weakness and the situation in which it was detected. To accomplish this, the detected sensor data are evaluated, and different ways of generating the requirement message may be provided in the method. For example, the information content transmitted with the requirement message may be defined differently.

Is it is important in this context for information to be transmitted about the situation in which non-optimum automatic controlling occurs and how this affects the automatic driving. By using this information, the control model responsible for the weakness may be ascertained, and the situations in which it is necessary to retrain the control model may be determined.

In other exemplary embodiments, the requirement message may be generated by a traffic monitoring apparatus 8 and transmitted to the server 2. This may be done in a manner analogous to the above-described procedure. In further exemplary embodiments, a requirement message may be transmitted between a plurality of vehicles 1 and/or traffic monitoring apparatuses 8, wherein for example a plurality of requirement messages may be coordinated, such as a confirmation by a plurality of apparatuses and units of a non-optimum functioning of an automatic driving function.

In a step S4, the requirement message is received by the server 2. In the exemplary embodiment, a plurality of requirement messages is received that were generated by one or more vehicles 1 and/or one or more traffic monitoring apparatuses 8. The server 2 undertakes preprocessing, wherein for example it is determined how many requirement messages were received for similar situations and/or the same control model. Alternatively or in addition, the severity of the requirement messages may be evaluated. By using the number and/or severity of requirement messages, they may be weighted in order to determine the control models for which optimization by training should be performed, and which data are required for this training.

In a step S5, a detection task is generated and transmitted to the vehicle 1. The detection task comprises conditions as to the situations in which sensor data are to be detected in order to be able to perform the desired training of a control model. The conditions comprised by the detection task relate, e.g., to parameters by which a situation is to be recognized for which the control model is to be trained.

In the exemplary embodiment, the detection task comprises information on specific functionalities, e.g., on a control model that is to be trained. It furthermore comprises situation parameters that for example serve as triggers and defining framework conditions for the training process to be performed, as well as system parameters to be optimized. Information is also comprised on how the sensor data are to be detected, for example with which spatial and/or temporal resolution, which quality and which type. Furthermore, information may be comprised on a specific training method such as an algorithm or parameters for training or learning rates. Furthermore, information thereon may comprise which meta-information should be collected during the learning phase.

In the exemplary embodiment, the detection task furthermore comprises information on a frequency with which data should be transmitted to the server 2, as well as a definition of the conditions that define a conclusion of the detection task and a final transmission of data to the server 2.

In a step S6, the vehicle 1 receives the detection task and detects sensor data sets by means of the detection unit 3, wherein the conditions comprised by the detection task are taken into consideration. For example, sensor data sets are detected continuously and stored in a ring memory that for example saves the sensor data sets of the last 10 minutes. If it is detected that the conditions of the detection task are fulfilled, i.e., when the vehicle 1 recognizes the presence of a certain driving situation for which training of a control model should be performed, corresponding data may be retrieved from the ring memory, including for the recent past.

Using the detected sensor data sets, transmission data are generated in another step S7 and transmitted from the vehicle 1 to the server 2. The transmission data are formed depending on the detection task. For example, the conditions comprised by the detection task define criteria for defining a situation in which for example a weakness of an automatic driving function, or respectively a control model, occurs. For the criteria specified in this way, functional variants are detected that for example comprise observations or variants learned using the sensor data sets. In this manner, the transmission data may be configured so that suitable data for a plurality of detection tasks may be transmitted, wherein overlapping criteria may be provided for different situations. For example, the situations "intersection with pedestrians at twilight" and "passing maneuver on highway at twilight" may have common criteria ("at twilight") for which functional variants should be transmitted to the server.

In the exemplary embodiment, the transmission data comprise an evaluation matrix that is configured in the following way:

|  | Criterion A | ... | Criterion Z |
|---|---|---|---|
| Functional variant 1 | $a_1$ | ... | $z_1$ |
| ... | ... | ... | ... |
| Functional variant n | $a_n$ | ... | $z_n$ |

In this case, "criterion A" to "criterion Z" designate the criteria that, e.g., are specified by the detection task; "functional variant 1" to "functional variant n" designate the learned variants, and "$a_1$" to "$a_n$" designate the values detected or respectively learned for variants.

In other exemplary embodiments, the sensor data sets may alternatively or additionally be prepared in another way and provided by the transmission data. In doing so, it is important for the transmission data to permit a training process, or respectively a learning process, for the control model for the situations of automatic driving defined using the detection task.

Other exemplary embodiments may provide that a learning process has already been performed for the control model by the vehicle 1, and the transmission data comprise information on the newly trained control model. To this end, a mode of the control model may, e.g., be activated in the vehicle 1 during which the control model does not actively intervene in controlling and may be changed by the learning process without safety-relevant driving functions having been changed thereby. Furthermore, a vehicle learning process may be allowed to a certain extent during active driving, wherein safety aspects are continuously monitored.

The point in time of generating and/or transmitting the transmission data may be determined in various ways. For example, this may always occur after a concluded drive, or if a data link to the server may be created. Furthermore, the detection task may comprise provisions as to when, or respectively under which conditions, generation and/or transmission should occur.

Other exemplary embodiments also provide a transmission of data between a plurality of vehicles 1. For example, sensor data sets and/or transmission data may be transmitted between the vehicles 1. This allows the data transmission to be configured more robustly, or learning processes may already be performed on the level of the vehicles 1 using a larger database.

In a step S8, the server receives the transmission data, and in a step S9, an updated control model is generated. In the exemplary embodiment, this generation is carried out by a machine learning method in which the information comprised by the transmission data is used for the function of a control model in certain situations. For example, the generation of the updated control model precedes a consolidation of the transmission data, possibly from a plurality of vehicles 1 and/or traffic monitoring apparatuses 8, wherein distributed learning methods may be used.

In the exemplary embodiment, a control model is assumed that is distributed to a plurality of vehicles 1 and is also available on the server 8. In updating the control model, a learning method is used, and training of the control model that exists on the server 8 is performed using the knowledge learned by the vehicles 1.

The training may occur in different ways in other exemplary embodiments. For example in the vehicles 1, training may be performed of the control models that are each available there, and parameters of these control models may be transmitted through the transmission data to the server 8. When the updated control module is being generated by the server 8, a comparison of the control model available on the server 8 may be made with the control models trained in the vehicles 1; for example, a communication of the values of parameters may be undertaken.

In a step S10, the updated control model is transmitted from the server 2 to the vehicle 1. In other exemplary embodiments, a release process may be upstream from this step in which, e.g., the safe functioning of an automatic driving function is ensured by means of the updated control model. This may for example be accomplished by a central entity; furthermore, automated methods may be performed by the server 2 for the release of the updated control model. This is, e.g., designed according to special legal specifications.

In a step S11, the vehicle 1 receives the updated control model and executes automatic driving, wherein the updated control model is used. The exemplary embodiment provides that the updated control model is used instead of the old control model for each assigned module for an automatic driving function. Other exemplary embodiments may provide that a backup copy of the old control model is retained which may be reused in the event that the updated control model functions poorly.

Figure 3:
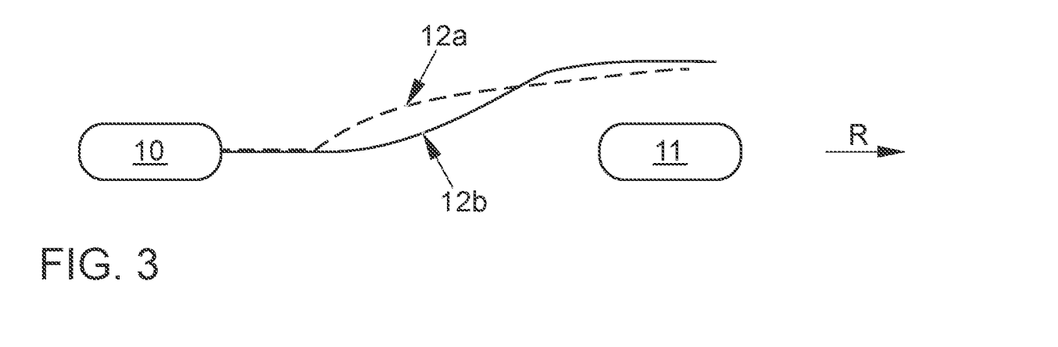
FIG. 3 shows an example of explorative detection of sensor data of automatic driving.

With regard to FIG. 3, an example is shown of explorative detection of sensor data of automatic driving. This relates, e.g., to a learning phase in which the vehicle 1 detects sensor data sets using the detection task; then the transmission data are formed using said sensor data sets.

FIG. 3 shows an automatically controlled first vehicle 10 that has received a detection task in the shown case and detects corresponding sensor data sets. In the driving direction (portrayed as arrow R) in front of the first of vehicle 10, there is another vehicle 11 that is to be passed.

In the automatic performance of the passing maneuver, a trajectory is determined along which the first vehicle 10 is to move in order to pass the other vehicle 11. In the exemplary embodiment, a plurality of potentially travelable trajectories 12*a*, 12*b* is generated for this, of which for example two are portrayed in the figure and which will be designated candidates 12a, 12b in the following. In another step, an evaluation of the candidates 12a, 12b is carried out, wherein, inter alia, the safety with which they may be traveled, how efficiently driving may be performed along the trajectories, and the time which is required for the passing procedure are determined.

An explorative learning phase in the exemplary embodiment provides that another trajectory 12a, 12b is used and not the trajectory 12a, 12b that is recognized as desired. This ensures that this other trajectory 12a, 12b may also be safely traveled; however, a test of slightly different parameters may be performed in order to be able to allow training of the corresponding control model using the sensor data sets detected while traveling these trajectories 12a, 12b.

This method may, e.g., be used in order for learning to be performed on the planning level, i.e., on a level for coordinating a plurality of modules for automatically controlling driving.

In other exemplary embodiments, other methods, for example from the field of machine learning, may be used in order to detect suitable sensor data sets using the detection task, and/or to generate transmission data, wherein training of a control model may, if applicable, already be performed in a mobile unit 1.

LIST OF REFERENCE NUMBERS

1 Mobile unit; vehicle
2 Central control unit; server
3 Detection unit
3a, 3b, 3c, 3d Sensors
4 Processing unit
5 Vehicle interface
6 Server interface
7 Updating unit
8 Traffic monitoring apparatus
9a, 9b, 9c Actuators
10 First vehicle
11 Other vehicle
12a, 12b Potential trajectories; candidates
R Arrow
21 Method steps in mobile unit
22 Method steps in central control unit
S1 Automatic driving
S2 Detection of a weakness
S3 Generation and transmission of a requirement message
S4 Reception and evaluation of requirement messages
S5 Generation and transmission of a detection task
S6 Reception of the detection task and detection of sensor data sets
S7 Generation and transmission of transmission data
S8 Reception of the transmission data
S9 Generation of an updated control model
S10 Transmission of the updated control model
S11 Reception of an updated control model and automatic driving The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures may not be used to advantage. Any reference signs in the claims should not be construed as limiting the scope.

What is claimed is:

1. A method for updating a control model for automatic control of one or more vehicles with an automatic driving function, comprising:
   generating at least one requirement message as a reaction to a recognized weakness in the control model;
   receiving, by a central control unit, the at least one requirement message;
   generating, by the central control unit, a detection task based on the at least one requirement message with conditions for detecting sensor data sets, the conditions defining at least one relationship between sensor data to be recorded and one or more vehicle driving situations;
   transmitting the detection task to a vehicle of the one or more vehicles;
   detecting, by one or more sensors of the vehicle, the sensor data sets based on the detection task, while the vehicle is travelling on a safely travelable non-ideal trajectory of a plurality of candidate trajectories;
   generating, by the vehicle, transmission data using the detected sensor data sets;
   transmitting, by the vehicle, the transmission data to the central control unit;
   reevaluating the safely travelable non-ideal trajectory; and
   generating, by the central control unit, an updated control model for automatic control of the vehicle using the received transmission data.

2. The method of claim 1, wherein the requirement message is generated by the vehicle.

3. The method of claim 2, wherein the central control unit receives a plurality of requirement messages, executes a weighting of the requirement messages, and generates a requirement task using the weighted requirement messages.

4. The method of claim 2, wherein conditions of the detection task comprise data on traffic situations.

5. The method of claim 2, wherein the central control unit performs training for a previous control model to generate the updated control model using the transmission data.

6. The method of claim 1, wherein the requirement message is generated by a traffic monitoring apparatus.

7. The method of claim 6, wherein the central control unit receives a plurality of requirement messages, executes a weighting of the requirement messages, and generates a requirement task using the weighted requirement messages.

8. The method of claim 6, wherein conditions of the detection task comprise data on traffic situations.

9. The method of claim 6, wherein the central control unit performs training for a previous control model to generate the updated control model using the transmission data.

10. The method of claim 1, wherein the central control unit receives a plurality of requirement messages, executes a weighting of the requirement messages, and generates a requirement task using the weighted requirement messages.

11. The method of claim 10, wherein conditions of the detection task comprise data on traffic situations.

12. The method of claim 1, wherein the conditions of the detection task comprise data on traffic situations.

13. The method of claim 1, wherein the central control unit performs training for a previous control model to generate the updated control model using the transmission data.

14. The method of claim 13, wherein training of an integrated control model is performed to generate the transmission data.

15. The method of claim 1, wherein
the updated control model is transmitted to the vehicle; and
automatic control of the vehicle is performed using the updated control model.

16. The method of claim 1, wherein conditions of the detection task comprise data on traffic situations.

17. The method of claim 1, wherein the central control unit performs training for a previous control model to generate the updated control model using the transmission data.

18. A system for updating a control model for automatic control of one or more vehicles with an automatic driving function, comprising a central control unit and a vehicle of the one or more vehicles, wherein
the central control unit is configured to:
receive at least one requirement message that is generated as a reaction to a recognized weakness in the control model;
to generate a detection task based on the at least one requirement message with conditions for detecting sensor data sets, the conditions defining at least one relationship between sensor data to be recorded and one or more vehicle driving situations; and
to transmit the detecting task to the vehicle; wherein
the vehicle is configured to detect the sensor data sets by one or more sensors based on the detection task while the vehicle is travelling on a safely travelable non-ideal trajectory of a plurality of candidate trajectories;
the vehicle is configured to generate transmission data using the detected sensor data sets and to transmit the transmission data to the central control unit; wherein
the system is configured to reevaluate the safely travelable non-ideal trajectory; and
the central control unit is configured to generate an updated control model for automatic control of the vehicle using the received transmission data.

19. A method for updating a control model of a vehicle automatic driving function, comprising, by a control unit:
receiving at least one requirement message, which requirement message is generated as a reaction to a recognized weakness in the control model;
generating a detection task based on the at least one requirement message with conditions for detecting sensor data sets, the conditions defining at least one relationship between sensor data to be recorded and one or more vehicle driving situations;
transmitting the detection task to at least one vehicle;
receiving transmission data based on detected sensor data sets from the at least one vehicle; and
updating the control model using the received transmission data.

* * * * *